(12) United States Patent
Meyer et al.

(10) Patent No.: US 8,589,643 B2
(45) Date of Patent: Nov. 19, 2013

(54) ARBITRATION SYSTEM AND METHOD FOR MEMORY RESPONSES IN A HUB-BASED MEMORY SYSTEM

(75) Inventors: James W. Meyer, Shoreview, MN (US); Cory Kanski, Blaine, MN (US)

(73) Assignee: Round Rock Research, LLC, Jersey City, NJ (US)

( * ) Notice: Subject to any disclaimer, the term of this patent is extended or adjusted under 35 U.S.C. 154(b) by 1523 days.

(21) Appl. No.: 11/318,356

(22) Filed: Dec. 22, 2005

(65) Prior Publication Data

US 2006/0136683 A1 Jun. 22, 2006

Related U.S. Application Data (62) Division of application No. 10/690,810, filed on Oct. 20, 2003, now Pat. No. 7,120,743.

(51) Int. Cl.
*G06F 12/00* (2006.01)
*G06F 13/00* (2006.01)

(52) U.S. Cl.
USPC .......................... 711/158; 711/100; 711/154

(58) Field of Classification Search
USPC .................... 711/100, 118, 154, 158
See application file for complete search history.

(56) References Cited

U.S. PATENT DOCUMENTS

| | | |
|---|---|---|
| 686,947 A | 11/1901 | Marsh et al. |
| 751,703 A | 2/1904 | Chilton et al. |
| 3,742,253 A | 6/1973 | Kronies ...................... 307/247 |
| 3,777,154 A | 12/1973 | Lindsey |
| 4,045,781 A | 8/1977 | Levy et al. ..................... 364/200 |
| 4,078,228 A | 3/1978 | Miyazaki .................. 340/147 R |
| 4,084,225 A | 4/1978 | Anderson et al. |
| 4,240,143 A | 12/1980 | Besemer et al. .............. 364/200 |
| 4,245,306 A | 1/1981 | Besemer et al. .............. 364/200 |
| 4,253,144 A | 2/1981 | Bellamy et al. ............... 364/200 |
| 4,253,146 A | 2/1981 | Bellamy et al. ............... 364/200 |
| 4,442,504 A | 4/1984 | Dummermuth et al. |
| 4,443,845 A | 4/1984 | Hamilton et al. |
| 4,608,702 A | 8/1986 | Hirzel et al. .................. 375/110 |
| 4,641,249 A | 2/1987 | Gion et al. |

(Continued)

FOREIGN PATENT DOCUMENTS

| | | |
|---|---|---|
| EP | 0395559 A2 | 10/1990 |
| EP | 0 709 786 A1 | 5/1996 |

(Continued)

OTHER PUBLICATIONS

Rambus, Inc., "Direct Rambus™ Technology Disclosure", Oct. 1997. pp. 1-16.

(Continued)

*Primary Examiner* — Tuan Thai
(74) *Attorney, Agent, or Firm* — Lerner, David, Littenberg, Krumholz & Mentlik, LLP (57) ABSTRACT

A memory hub includes a local queue that stores local memory responses, a bypass path that passes downstream memory responses, and a buffered queue coupled to the bypass path that stores downstream memory responses from the bypass path. A multiplexer is coupled to the local queue, buffered queue, and the bypass path and outputs responses from a selected one of the queues or the bypass path responsive to a control signal. Arbitration control logic is coupled to the multiplexer and the queues and develops the control signal to control the response output by the multiplexer.

25 Claims, 3 Drawing Sheets

(56) References Cited

U.S. PATENT DOCUMENTS

| | | |
|---|---|---|
| 4,707,823 A | 11/1987 | Holdren et al. ............... 370/1 |
| 4,724,520 A | 2/1988 | Athanas et al. ............. 364/200 |
| 4,809,232 A | 2/1989 | Baumbaugh et al. |
| 4,813,772 A | 3/1989 | Kowel et al. |
| 4,823,403 A | 4/1989 | Twietmeyer |
| 4,825,208 A | 4/1989 | Mueller et al. |
| 4,831,520 A | 5/1989 | Rubinfeld et al. ........... 364/200 |
| 4,843,263 A | 6/1989 | Ando ........................ 307/480 |
| 4,891,808 A | 1/1990 | Williams .................... 370/112 |
| 4,930,128 A | 5/1990 | Suzuki et al. ............... 371/12 |
| 4,953,930 A | 9/1990 | Ramsey et al. ............ 350/96.11 |
| 4,982,185 A | 1/1991 | Holmberg et al. ........ 340/825.21 |
| 4,989,113 A | 1/1991 | Asal |
| 5,123,016 A | 6/1992 | Muller et al. |
| 5,133,059 A | 7/1992 | Ziegler et al. |
| 5,241,506 A | 8/1993 | Motegi et al. ............... 365/210 |
| 5,243,703 A | 9/1993 | Farmwald et al. ........... 395/325 |
| 5,251,303 A | 10/1993 | Fogg, Jr. et al. ............ 395/275 |
| 5,269,022 A | 12/1993 | Shinjo et al. ................ 395/700 |
| 5,274,584 A | 12/1993 | Henderson et al. |
| 5,287,343 A | 2/1994 | Nakamura et al. |
| 5,299,293 A | 3/1994 | Mestdagh et al. ............ 359/110 |
| 5,307,381 A | 4/1994 | Ahuja |
| 5,313,590 A | 5/1994 | Taylor ......................... 395/325 |
| 5,317,752 A | 5/1994 | Jewett et al. ................ 395/750 |
| 5,319,755 A | 6/1994 | Farmwald et al. ........... 395/325 |
| 5,327,553 A | 7/1994 | Jewett et al. ................ 395/575 |
| 5,349,587 A | 9/1994 | Nadeau-Dostie et al. |
| 5,355,391 A | 10/1994 | Horowitz et al. ............ 375/36 |
| 5,379,382 A | 1/1995 | Work et al. |
| 5,388,265 A | 2/1995 | Volk |
| 5,414,819 A | 5/1995 | Redmond et al. |
| 5,423,009 A | 6/1995 | Zhu |
| 5,432,823 A | 7/1995 | Gasbarro et al. ............ 375/356 |
| 5,432,907 A | 7/1995 | Picazo, Jr. et al. .......... 395/200 |
| 5,442,770 A | 8/1995 | Barratt ....................... 395/403 |
| 5,446,741 A | 8/1995 | Boldt et al. |
| 5,450,578 A | 9/1995 | Mackenthun |
| 5,461,627 A | 10/1995 | Rypinski ..................... 370/95.2 |
| 5,465,229 A | 11/1995 | Bechtolsheim et al. ...... 345/477 |
| 5,465,343 A | 11/1995 | Henson et al. |
| 5,479,370 A | 12/1995 | Furuyama et al. ......... 365/189.12 |
| 5,493,437 A | 2/1996 | Lebby et al. |
| 5,497,476 A | 3/1996 | Oldfield et al. ............. 395/439 |
| 5,497,479 A | 3/1996 | Hornbuckle |
| 5,502,621 A | 3/1996 | Schumacher et al. ....... 361/760 |
| 5,532,856 A | 7/1996 | Li et al. |
| 5,544,319 A | 8/1996 | Acton et al. ............ 395/200.07 |
| 5,544,345 A | 8/1996 | Carpenter et al. |
| 5,546,591 A | 8/1996 | Wurzburg et al. |
| 5,566,325 A | 10/1996 | Bruce, II et al. ............ 395/494 |
| 5,568,574 A | 10/1996 | Tanguay, Jr. et al. |
| 5,572,722 A | 11/1996 | Vogley |
| 5,577,220 A | 11/1996 | Combs et al. ............... 395/416 |
| 5,581,482 A | 12/1996 | Wiedenman et al. |
| 5,581,767 A | 12/1996 | Katsuki et al. .............. 395/800 |
| 5,606,717 A | 2/1997 | Farmwald et al. ........... 395/856 |
| 5,608,264 A | 3/1997 | Gaul |
| 5,613,075 A | 3/1997 | Wade et al. |
| 5,619,670 A | 4/1997 | Shindo |
| 5,619,676 A | 4/1997 | Fukuda et al. |
| 5,621,739 A | 4/1997 | Sine et al. |
| 5,621,883 A | 4/1997 | Thoulon et al. |
| 5,623,534 A | 4/1997 | Desai et al. |
| 5,638,334 A | 6/1997 | Farmwald et al. ........ 365/230.03 |
| 5,638,534 A | 6/1997 | Mote, Jr. ..................... 395/485 |
| 5,644,784 A | 7/1997 | Peek |
| 5,659,713 A | 8/1997 | Goodwin et al. |
| 5,659,798 A | 8/1997 | Blumrich et al. ........... 395/846 |
| 5,687,325 A | 11/1997 | Chang ......................... 395/284 |
| 5,706,224 A | 1/1998 | Srinivasan et al. ........... 365/49 |
| 5,710,733 A | 1/1998 | Chengson et al. ............ 365/52 |
| 5,715,456 A | 2/1998 | Bennett et al. .............. 395/652 |
| 5,729,709 A | 3/1998 | Harness ...................... 395/405 |
| 5,748,616 A | 5/1998 | Riley .......................... 370/242 |
| 5,768,152 A | 6/1998 | Battaline et al. |
| 5,786,152 A | 7/1998 | Marengere et al. |
| 5,787,475 A | 7/1998 | Pawlowski |
| 5,790,048 A | 8/1998 | Hsieh et al. |
| 5,793,776 A | 8/1998 | Qureshi et al. |
| 5,796,413 A | 8/1998 | Shipp et al. ................. 345/522 |
| 5,799,048 A | 8/1998 | Farjad-Rad et al. |
| 5,808,897 A | 9/1998 | Miller, Jr. et al. |
| 5,818,844 A | 10/1998 | Singh et al. ................. 370/463 |
| 5,818,984 A | 10/1998 | Ahmad et al. |
| 5,819,304 A | 10/1998 | Nilsen et al. ................... 711/5 |
| 5,822,255 A | 10/1998 | Uchida ........................ 365/194 |
| 5,831,467 A | 11/1998 | Leung et al. |
| 5,832,250 A | 11/1998 | Whittaker .................... 395/471 |
| 5,838,931 A | 11/1998 | Regenold et al. |
| 5,872,944 A | 2/1999 | Goldrian et al. |
| 5,875,352 A | 2/1999 | Gentry et al. ................ 395/843 |
| 5,875,454 A | 2/1999 | Craft et al. .................. 711/113 |
| 5,881,072 A | 3/1999 | Dell |
| 5,887,159 A | 3/1999 | Burrows ...................... 395/567 |
| 5,889,714 A | 3/1999 | Schumann et al. .......... 365/203 |
| 5,893,089 A | 4/1999 | Kikinis |
| 5,900,020 A | 5/1999 | Safranek et al. ............. 711/167 |
| 5,905,858 A | 5/1999 | Jeddeloh |
| 5,912,852 A | 6/1999 | Lawrence et al. |
| 5,914,902 A | 6/1999 | Lawrence et al. |
| 5,928,343 A | 7/1999 | Farmwald et al. ........... 710/104 |
| 5,944,800 A | 8/1999 | Mattheis et al. |
| 5,953,743 A | 9/1999 | Jeddeloh |
| 5,959,914 A | 9/1999 | Gates et al. |
| 5,963,942 A | 10/1999 | Igata ............................... 707/6 |
| 5,966,724 A | 10/1999 | Ryan ........................... 711/105 |
| 5,973,935 A | 10/1999 | Schoenfeld et al. .......... 361/813 |
| 5,973,951 A | 10/1999 | Bechtolsheim et al. ........ 365/52 |
| 5,978,567 A | 11/1999 | Rebane et al. ........... 395/200.49 |
| 5,987,196 A | 11/1999 | Noble ........................... 385/14 |
| 6,006,340 A | 12/1999 | O'Connell |
| 6,011,741 A | 1/2000 | Wallace et al. .............. 365/221 |
| 6,014,721 A * | 1/2000 | Arimilli et al. .............. 710/315 |
| 6,023,726 A | 2/2000 | Saksena ....................... 709/219 |
| 6,023,738 A | 2/2000 | Priem et al. |
| 6,026,226 A | 2/2000 | Heile et al. |
| 6,029,250 A | 2/2000 | Keeth .......................... 713/400 |
| 6,031,241 A | 2/2000 | Silfvast et al. ............. 250/504 R |
| 6,033,951 A | 3/2000 | Chao ........................... 438/253 |
| 6,038,630 A | 3/2000 | Foster et al. ................. 710/132 |
| 6,061,263 A | 5/2000 | Boaz et al. .................... 365/51 |
| 6,061,296 A | 5/2000 | Ternullo, Jr. et al. ......... 365/233 |
| 6,064,706 A | 5/2000 | Driskill et al. ............... 375/372 |
| 6,067,262 A | 5/2000 | Irrinki et al. ................. 365/201 |
| 6,067,649 A | 5/2000 | Goodwin ...................... 714/718 |
| 6,073,190 A | 6/2000 | Rooney ......................... 710/56 |
| 6,076,139 A | 6/2000 | Welker et al. ................ 711/104 |
| 6,078,451 A | 6/2000 | Ioki |
| 6,079,008 A | 6/2000 | Clery, III ...................... 712/11 |
| 6,088,774 A | 7/2000 | Gillingham |
| 6,092,158 A | 7/2000 | Harriman et al. ............ 711/151 |
| 6,098,158 A | 8/2000 | Lay et al. ..................... 711/162 |
| 6,100,735 A | 8/2000 | Lu ................................ 327/158 |
| 6,101,151 A | 8/2000 | Watanabe et al. |
| 6,105,075 A | 8/2000 | Ghaffari ......................... 710/5 |
| 6,105,088 A | 8/2000 | Pascale et al. |
| 6,111,757 A | 8/2000 | Dell et al. .................... 361/737 |
| 6,118,719 A | 9/2000 | Dell et al. |
| 6,125,431 A | 9/2000 | Kobayashi ................... 711/154 |
| 6,128,703 A | 10/2000 | Bourekas et al. ............ 711/138 |
| 6,128,706 A | 10/2000 | Bryg et al. |
| 6,131,149 A | 10/2000 | Lu et al. ...................... 711/167 |
| 6,134,624 A | 10/2000 | Burns et al. .................. 710/131 |
| 6,137,709 A | 10/2000 | Boaz et al. .................... 365/51 |
| 6,144,327 A | 11/2000 | Distinti et al. |
| 6,144,587 A | 11/2000 | Yoshida ..................... 365/189.05 |
| 6,145,033 A | 11/2000 | Chee |
| 6,157,743 A | 12/2000 | Goris et al. |
| 6,157,962 A | 12/2000 | Hodges et al. |
| 6,167,465 A | 12/2000 | Parvin et al. ................... 710/22 |
| 6,167,486 A | 12/2000 | Lee et al. ..................... 711/120 |
| 6,173,388 B1 | 1/2001 | Abercrombie et al. |
| 6,175,571 B1 | 1/2001 | Haddock et al. ............. 370/423 |

(56) References Cited

U.S. PATENT DOCUMENTS

| | | | |
|---|---|---|---|
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,205,564 B1 | 3/2001 | Kim et al. | |
| 6,208,180 B1 | 3/2001 | Fisch et al. | 327/141 |
| 6,212,590 B1 | 4/2001 | Melo et al. | |
| 6,216,178 B1 | 4/2001 | Stracovsky et al. | |
| 6,216,219 B1 | 4/2001 | Cai et al. | |
| 6,219,725 B1 | 4/2001 | Diehl et al. | 710/26 |
| 6,223,301 B1 | 4/2001 | Santeler et al. | 714/6 |
| 6,226,729 B1 | 5/2001 | Stevens et al. | |
| 6,229,712 B1 | 5/2001 | Munoz-Bustamante et al. | |
| 6,229,727 B1 | 5/2001 | Doyle | |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,252,821 B1 | 6/2001 | Nizar et al. | |
| 6,256,253 B1 | 7/2001 | Oberlaender et al. | |
| 6,256,325 B1 | 7/2001 | Park | 370/503 |
| 6,256,692 B1 | 7/2001 | Yoda et al. | 710/104 |
| 6,266,730 B1 | 7/2001 | Perino et al. | 710/126 |
| 6,272,600 B1 * | 8/2001 | Talbot et al. | 711/140 |
| 6,272,609 B1 | 8/2001 | Jeddeloh | 711/16.9 |
| 6,275,914 B1 | 8/2001 | Jeddeloh | |
| 6,278,755 B1 | 8/2001 | Baba et al. | 375/360 |
| 6,285,349 B1 | 9/2001 | Smith | 345/147 |
| 6,286,083 B1 | 9/2001 | Chin et al. | 711/151 |
| 6,289,068 B1 | 9/2001 | Hassoun et al. | 375/376 |
| 6,294,937 B1 | 9/2001 | Crafts et al. | 327/158 |
| 6,301,637 B1 | 10/2001 | Krull et al. | 711/112 |
| 6,324,485 B1 | 11/2001 | Ellis | 702/117 |
| 6,327,642 B1 | 12/2001 | Lee et al. | 711/120 |
| 6,327,650 B1 | 12/2001 | Bapst et al. | 712/228 |
| 6,330,205 B2 | 12/2001 | Shimizu et al. | 365/230.06 |
| 6,330,639 B1 | 12/2001 | Fanning et al. | |
| 6,343,171 B1 | 1/2002 | Yoshimura et al. | |
| 6,344,664 B1 | 2/2002 | Trezza et al. | |
| 6,347,055 B1 | 2/2002 | Motomura | 365/189.05 |
| 6,349,363 B2 | 2/2002 | Cai et al. | 711/129 |
| 6,351,834 B1 | 2/2002 | Maekawa et al. | |
| 6,356,573 B1 | 3/2002 | Jonsson et al. | 372/46 |
| 6,366,375 B1 | 4/2002 | Sakai et al. | |
| 6,366,529 B1 | 4/2002 | Williams et al. | |
| 6,367,074 B1 | 4/2002 | Bates et al. | 717/11 |
| 6,370,068 B2 | 4/2002 | Rhee | 365/196 |
| 6,370,601 B1 | 4/2002 | Baxter | |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,149 B1 | 6/2002 | Dennin et al. | 710/58 |
| 6,401,213 B1 | 6/2002 | Jeddeloh | 713/401 |
| 6,405,273 B1 | 6/2002 | Fleck et al. | |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,635 B1 | 8/2002 | Case et al. | |
| 6,434,639 B1 | 8/2002 | Haghighi | 710/39 |
| 6,434,654 B1 | 8/2002 | Story et al. | |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,442,722 B1 | 8/2002 | Nadeau-Dostie et al. | |
| 6,446,174 B1 | 9/2002 | Dow | |
| 6,449,308 B1 | 9/2002 | Knight, Jr. et al. | 375/212 |
| 6,453,377 B1 | 9/2002 | Farnworth et al. | |
| 6,453,393 B1 | 9/2002 | Holman et al. | 711/154 |
| 6,457,116 B1 | 9/2002 | Mirsky et al. | 712/16 |
| 6,460,108 B1 | 10/2002 | McCoskey et al. | |
| 6,460,114 B1 | 10/2002 | Jeddeloh | 711/120 |
| 6,462,978 B2 | 10/2002 | Shibata et al. | 365/63 |
| 6,463,059 B1 | 10/2002 | Movshovich et al. | 370/389 |
| 6,467,013 B1 | 10/2002 | Nizar | 711/1 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,556 B1 | 11/2002 | Downs et al. | 707/101 |
| 6,487,628 B1 | 11/2002 | Duong et al. | |
| 6,487,648 B1 | 11/2002 | Hassoun | |
| 6,490,188 B2 | 12/2002 | Nuxoll et al. | 365/63 |
| 6,493,784 B1 | 12/2002 | Kamimura et al. | |
| 6,493,803 B1 | 12/2002 | Pham et al. | 711/147 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,502,161 B1 | 12/2002 | Perego et al. | |
| 6,505,287 B2 | 1/2003 | Uematsu | 711/170 |
| 6,507,899 B1 | 1/2003 | Oberlaender et al. | |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,526,498 B1 | 2/2003 | Mirsky et al. | 712/11 |
| 6,538,465 B1 | 3/2003 | Demone | |
| 6,539,490 B1 | 3/2003 | Forbes et al. | 713/401 |
| 6,552,304 B1 | 4/2003 | Hirose et al. | |
| 6,552,564 B1 | 4/2003 | Forbes et al. | 326/30 |
| 6,553,476 B1 | 4/2003 | Ayaki et al. | |
| 6,553,479 B2 | 4/2003 | Mirsky et al. | 712/16 |
| 6,564,329 B1 | 5/2003 | Cheung et al. | 713/322 |
| 6,567,963 B1 | 5/2003 | Trezza | |
| 6,570,429 B1 | 5/2003 | Hellriegel | |
| 6,577,174 B2 | 6/2003 | Locker et al. | |
| 6,584,543 B2 | 6/2003 | Williams et al. | |
| 6,584,577 B1 | 6/2003 | Nurser | |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,599,031 B2 | 7/2003 | Li | |
| 6,615,325 B2 | 9/2003 | Mailloux et al. | 711/154 |
| 6,622,186 B1 | 9/2003 | Moniot et al. | 710/52 |
| 6,622,188 B1 | 9/2003 | Goodwin et al. | 710/101 |
| 6,622,227 B2 | 9/2003 | Zumkehr et al. | 711/167 |
| 6,623,177 B1 | 9/2003 | Chilton | |
| 6,625,702 B2 | 9/2003 | Rentschler et al. | |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,633,576 B1 | 10/2003 | Melaragni et al. | 370/412 |
| 6,633,959 B2 | 10/2003 | Arimilli et al. | |
| 6,636,110 B1 | 10/2003 | Ooishi et al. | 327/565 |
| 6,636,912 B2 | 10/2003 | Ajanovic et al. | 710/105 |
| 6,636,957 B2 | 10/2003 | Stevens et al. | |
| 6,643,787 B1 | 11/2003 | Zerbe et al. | |
| 6,646,929 B1 | 11/2003 | Moss et al. | 365/194 |
| 6,647,470 B1 | 11/2003 | Janzen | 711/154 |
| 6,651,139 B1 | 11/2003 | Ozeki et al. | |
| 6,658,509 B1 | 12/2003 | Bonella et al. | 710/100 |
| 6,661,940 B2 | 12/2003 | Kim | |
| 6,661,943 B2 | 12/2003 | Li | |
| 6,662,304 B2 | 12/2003 | Keeth et al. | 713/400 |
| 6,665,202 B2 | 12/2003 | Lindahl et al. | 365/49 |
| 6,667,895 B2 | 12/2003 | Jang et al. | 365/63 |
| 6,667,926 B1 * | 12/2003 | Chen et al. | 365/221 |
| 6,670,833 B2 | 12/2003 | Kurd et al. | 327/156 |
| 6,675,117 B2 | 1/2004 | Adam et al. | |
| 6,681,292 B2 | 1/2004 | Creta et al. | 711/119 |
| 6,681,301 B1 | 1/2004 | Mehta et al. | |
| 6,681,302 B2 | 1/2004 | Cho et al. | |
| 6,697,926 B2 | 2/2004 | Johnson et al. | 711/167 |
| 6,704,817 B1 | 3/2004 | Steinman et al. | |
| 6,707,726 B2 | 3/2004 | Nishio et al. | |

(56) References Cited

U.S. PATENT DOCUMENTS

| | | |
|---|---|---|
| 6,711,652 B2 | 3/2004 | Arimilli et al. |
| 6,715,018 B2 | 3/2004 | Farnworth et al. ............ 710/300 |
| 6,718,440 B2 | 4/2004 | Maiyuran et al. ............ 711/137 |
| 6,721,187 B2 | 4/2004 | Hall et al. |
| 6,721,195 B2 | 4/2004 | Brunelle et al. ............... 365/63 |
| 6,721,860 B2 | 4/2004 | Klein ........................... 711/154 |
| 6,724,685 B2 | 4/2004 | Braun et al. ................... 365/233 |
| 6,725,349 B2 | 4/2004 | Langendorf et al. |
| 6,728,800 B1 | 4/2004 | Lee et al. ....................... 710/54 |
| 6,731,548 B2 | 5/2004 | Pax |
| 6,732,203 B2 | 5/2004 | Kanapathippillai et al. |
| 6,735,679 B1 | 5/2004 | Herbst et al. .................. 711/167 |
| 6,735,682 B2 | 5/2004 | Segelken et al. ............. 711/220 |
| 6,742,098 B1 | 5/2004 | Halbert et al. ............... 711/172 |
| 6,745,275 B2 | 6/2004 | Chang ........................... 710/305 |
| 6,751,113 B2 | 6/2004 | Bhakta et al. ................... 365/63 |
| 6,751,703 B2 | 6/2004 | Chilton ......................... 711/113 |
| 6,751,722 B2 | 6/2004 | Mirsky et al. ................... 712/15 |
| 6,752,539 B2 | 6/2004 | Colgan et al. |
| 6,754,117 B2 | 6/2004 | Jeddeloh ...................... 365/201 |
| 6,754,812 B1 | 6/2004 | Abdallah et al. ............. 712/234 |
| 6,756,661 B2 | 6/2004 | Tsuneda et al. .............. 257/673 |
| 6,760,833 B1 | 7/2004 | Dowling ........................ 712/34 |
| 6,760,873 B1 | 7/2004 | Hao et al. |
| 6,771,538 B2 | 8/2004 | Shukuri et al. ........... 365/185.05 |
| 6,772,261 B1 | 8/2004 | D'Antonio et al. |
| 6,772,295 B2 | 8/2004 | Spencer et al. |
| 6,775,747 B2 | 8/2004 | Venkatraman ............... 711/137 |
| 6,782,435 B2 | 8/2004 | Garcia et al. ................... 710/33 |
| 6,782,465 B1 | 8/2004 | Schmidt |
| 6,782,466 B1 | 8/2004 | Steele et al. |
| 6,785,780 B1 | 8/2004 | Klein et al. ................... 711/148 |
| 6,788,104 B2 | 9/2004 | Singh et al. |
| 6,789,173 B1 | 9/2004 | Tanaka et al. ................ 711/147 |
| 6,792,059 B2 | 9/2004 | Yuan et al. .................... 375/354 |
| 6,792,496 B2 | 9/2004 | Aboulenein et al. ......... 710/306 |
| 6,793,408 B2 | 9/2004 | Levy et al. |
| 6,793,411 B2 | 9/2004 | Seifert |
| 6,795,899 B2 | 9/2004 | Dodd et al. ................... 711/137 |
| 6,799,246 B1 | 9/2004 | Wise et al. .................... 711/117 |
| 6,799,268 B2 | 9/2004 | Boggs et al. ................... 712/228 |
| 6,804,760 B2 | 10/2004 | Wiliams ........................ 711/170 |
| 6,804,764 B2 | 10/2004 | LaBerge et al. .............. 711/170 |
| 6,807,630 B2 | 10/2004 | Lay et al. .......................... 713/2 |
| 6,811,320 B1 | 11/2004 | Abbott ............................ 385/58 |
| 6,816,931 B2 | 11/2004 | Shih |
| 6,816,947 B1 | 11/2004 | Huffman ....................... 711/151 |
| 6,820,181 B2 | 11/2004 | Jeddeloh et al. ............. 711/169 |
| 6,821,029 B1 | 11/2004 | Grung et al. ..................... 385/92 |
| 6,823,023 B1 | 11/2004 | Hannah ......................... 375/296 |
| 6,829,398 B2 | 12/2004 | Ouchi |
| 6,829,705 B2 | 12/2004 | Smith |
| 6,832,303 B2 | 12/2004 | Tanaka |
| 6,832,306 B1 | 12/2004 | Ganapathy et al. |
| 6,845,409 B1 | 1/2005 | Talagala et al. ................ 710/20 |
| 6,859,856 B2 | 2/2005 | Piau et al. |
| 6,880,117 B2 | 4/2005 | Lin et al. |
| 6,889,304 B2 | 5/2005 | Perego et al. ................. 711/170 |
| 6,901,494 B2 | 5/2005 | Zumkehr et al. ............. 711/167 |
| 6,901,500 B1 | 5/2005 | Hussain et al. |
| 6,904,556 B2 | 6/2005 | Walton et al. ................ 714/766 |
| 6,910,109 B2 | 6/2005 | Holman et al. .............. 711/156 |
| 6,910,812 B2 | 6/2005 | Pommer et al. |
| 6,912,612 B2 | 6/2005 | Kapur et al. .................. 710/309 |
| 6,928,528 B1 | 8/2005 | Hewitt |
| 6,941,433 B1 | 9/2005 | Libby et al. |
| 6,947,050 B2 | 9/2005 | Jeddeloh |
| 6,947,672 B2 | 9/2005 | Jiang et al. ................... 398/135 |
| 6,948,094 B2 | 9/2005 | Schultz et al. |
| 6,949,406 B2 | 9/2005 | Bosnyak et al. |
| 6,950,956 B2 | 9/2005 | Zerbe et al. |
| 6,952,745 B1 | 10/2005 | Dodd et al. |
| 6,956,996 B2 | 10/2005 | Gordon et al. |
| 6,961,259 B2 | 11/2005 | Lee et al. |
| 6,961,834 B2 | 11/2005 | Weber |
| 6,970,968 B1 | 11/2005 | Holman |
| 6,972,981 B2 | 12/2005 | Ruckerbauer et al. |
| 6,980,042 B2 | 12/2005 | LaBerge |
| 6,980,748 B2 | 12/2005 | Leas |
| 6,982,892 B2 | 1/2006 | Lee et al. |
| 7,000,062 B2 | 2/2006 | Perego et al. |
| 7,007,130 B1 | 2/2006 | Holman |
| 7,016,213 B2 | 3/2006 | Reeves et al. |
| 7,016,606 B2 | 3/2006 | Cai et al. |
| 7,024,547 B2 | 4/2006 | Kartoz |
| 7,035,212 B1 | 4/2006 | Mittal et al. |
| 7,036,055 B2 | 4/2006 | Muljono et al. |
| 7,046,060 B1 | 5/2006 | Minzoni et al. ............... 327/158 |
| 7,047,351 B2 | 5/2006 | Jeddeloh |
| 7,062,595 B2 | 6/2006 | Lindsay et al. |
| 7,068,085 B2 | 6/2006 | Gomm et al. .................. 327/158 |
| 7,102,907 B2 | 9/2006 | Lee et al. |
| 7,106,611 B2 | 9/2006 | Lee et al. |
| 7,106,973 B2 | 9/2006 | Kube et al. |
| 7,107,415 B2 | 9/2006 | Jeddeloh et al. |
| 7,116,143 B2 | 10/2006 | Deivasigamani et al. |
| 7,117,316 B2 | 10/2006 | Jeddeloh |
| 7,120,723 B2 | 10/2006 | Jeddeloh |
| 7,120,727 B2 | 10/2006 | Lee et al. |
| 7,120,743 B2 | 10/2006 | Meyer et al. |
| 7,133,972 B2 | 11/2006 | Jeddeloh |
| 7,133,991 B2 | 11/2006 | James |
| 7,136,953 B1 | 11/2006 | Bisson et al. |
| 7,136,958 B2 | 11/2006 | Jeddeloh |
| 7,149,874 B2 | 12/2006 | Jeddeloh |
| 7,155,645 B1 | 12/2006 | Korhonen |
| 7,162,567 B2 | 1/2007 | Jeddeloh |
| 7,171,508 B2 | 1/2007 | Choi |
| 7,174,409 B2 | 2/2007 | Jeddeloh |
| 7,181,584 B2 | 2/2007 | LaBerge ....................... 711/167 |
| 7,187,742 B1 | 3/2007 | Logue et al. .................. 375/376 |
| 7,188,219 B2 | 3/2007 | Jeddeloh |
| 7,191,088 B1 | 3/2007 | Reed et al. |
| 7,200,024 B2 | 4/2007 | Taylor |
| 7,206,887 B2 | 4/2007 | Jeddeloh |
| 7,210,059 B2 | 4/2007 | Jeddeloh |
| 7,213,082 B2 | 5/2007 | Jeddeloh |
| 7,216,196 B2 | 5/2007 | Jeddeloh |
| 7,222,210 B2 | 5/2007 | Jeddeloh |
| 7,222,213 B2 | 5/2007 | James |
| 7,234,070 B2 | 6/2007 | James |
| 7,242,213 B2 | 7/2007 | Pax et al. |
| 7,245,145 B2 | 7/2007 | Pax et al. |
| 7,254,075 B2 | 8/2007 | Woo et al. |
| 7,254,331 B2 | 8/2007 | Murphy |
| 7,266,633 B2 | 9/2007 | James |
| 7,278,060 B2 | 10/2007 | Jeddeloh |
| 7,282,947 B2 | 10/2007 | Pax et al. |
| 7,289,347 B2 | 10/2007 | Taylor |
| 7,310,748 B2 | 12/2007 | Jeddeloh |
| 7,310,752 B2 | 12/2007 | Jeddeloh |
| 7,315,053 B2 | 1/2008 | Hosomi et al. |
| 7,318,130 B2 | 1/2008 | Morrow et al. |
| 7,343,444 B2 | 3/2008 | Lee et al. |
| 7,386,649 B2 | 6/2008 | Jeddeloh |
| 7,557,601 B2 | 7/2009 | Pax et al. |
| 7,581,055 B2 | 8/2009 | Jeddeloh |
| 7,584,336 B2 | 9/2009 | Tremaine |
| 7,689,879 B2 | 3/2010 | Jeddeloh |
| 7,716,444 B2 | 5/2010 | Jeddeloh et al. |
| 7,768,325 B2 | 8/2010 | Milton |
| 7,818,497 B2 | 10/2010 | Gower et al. |
| 8,086,815 B2 | 12/2011 | Jeddeloh et al. |
| 2001/0013110 A1 | 8/2001 | Pierce et al. |
| 2001/0023474 A1 | 9/2001 | Kyozuka et al. |
| 2001/0034839 A1 | 10/2001 | Karjoth et al. |
| 2001/0038611 A1 | 11/2001 | Darcie et al. ................. 370/248 |
| 2001/0039612 A1 | 11/2001 | Lee ................................... 713/2 |
| 2002/0002656 A1 | 1/2002 | Honma et al. |
| 2002/0013881 A1 | 1/2002 | Delp et al. |
| 2002/0023203 A1 | 2/2002 | Cofler et al. |
| 2002/0033276 A1 | 3/2002 | Dabral et al. |
| 2002/0038412 A1 | 3/2002 | Nizar et al. |
| 2002/0042863 A1 | 4/2002 | Jeddeloh |

(56) References Cited

U.S. PATENT DOCUMENTS

| | | |
|---|---|---|
| 2002/0046379 A1 | 4/2002 | Miki et al. |
| 2002/0056063 A1 | 5/2002 | Nerl |
| 2002/0062466 A1 | 5/2002 | Noguchi |
| 2002/0066052 A1 | 5/2002 | Olarig et al. |
| 2002/0078298 A1 | 6/2002 | Jeddeloh |
| 2002/0083287 A1 | 6/2002 | Zumkehr et al. |
| 2002/0084458 A1 | 7/2002 | Halbert et al. ............... 257/63 |
| 2002/0089925 A1 | 7/2002 | Smith et al. |
| 2002/0104043 A1 | 8/2002 | Reynolds et al. |
| 2002/0104045 A1 | 8/2002 | Cooper |
| 2002/0112119 A1 | 8/2002 | Halbert et al. ............... 711/115 |
| 2002/0116081 A1 | 8/2002 | Wood et al. |
| 2002/0116588 A1 | 8/2002 | Beckert et al. ............... 711/161 |
| 2002/0120709 A1 | 8/2002 | Chow et al. |
| 2002/0144027 A1 | 10/2002 | Schmisseur |
| 2002/0144054 A1 | 10/2002 | Fanning et al. |
| 2002/0144064 A1 | 10/2002 | Fanning ............... 711/144 |
| 2002/0178319 A1 | 11/2002 | Sanchez-Olea ............... 710/305 |
| 2002/0194558 A1 | 12/2002 | Wang et al. |
| 2002/0199136 A1 | 12/2002 | Ku |
| 2002/0199139 A1 | 12/2002 | Dortu et al. |
| 2003/0005223 A1 | 1/2003 | Coulson et al. ............... 711/118 |
| 2003/0005344 A1 | 1/2003 | Bhamidipati et al. ......... 713/400 |
| 2003/0014578 A1 | 1/2003 | Pax |
| 2003/0015899 A1 | 1/2003 | Clay |
| 2003/0023840 A1 | 1/2003 | Zitlaw et al. |
| 2003/0035836 A1 | 2/2003 | Shanghvi et al. |
| 2003/0043158 A1 | 3/2003 | Wasserman et al. ............ 345/545 |
| 2003/0043426 A1 | 3/2003 | Baker et al. ............... 359/109 |
| 2003/0046628 A1 | 3/2003 | Rankin et al. |
| 2003/0056038 A1 | 3/2003 | Cochran |
| 2003/0065836 A1 | 4/2003 | Pecone |
| 2003/0074601 A1 | 4/2003 | Schultz et al. |
| 2003/0093630 A1 | 5/2003 | Richard et al. ............... 711/154 |
| 2003/0095559 A1 | 5/2003 | Sano et al. ............... 370/419 |
| 2003/0110368 A1 | 6/2003 | Kartoz |
| 2003/0149809 A1 | 8/2003 | Jensen et al. ............... 710/22 |
| 2003/0156581 A1 | 8/2003 | Osborne ............... 370/389 |
| 2003/0156639 A1 | 8/2003 | Liang |
| 2003/0158995 A1 | 8/2003 | Lee et al. |
| 2003/0163649 A1 | 8/2003 | Kapur et al. ............... 711/146 |
| 2003/0177320 A1 | 9/2003 | Sah et al. ............... 711/158 |
| 2003/0191913 A1 | 10/2003 | Holman et al. |
| 2003/0193927 A1 | 10/2003 | Hronik ............... 370/351 |
| 2003/0214339 A1 | 11/2003 | Miyamoto |
| 2003/0217223 A1 | 11/2003 | Nino, Jr. et al. ............... 711/105 |
| 2003/0219223 A1 | 11/2003 | Shinkai et al. |
| 2003/0223295 A1 | 12/2003 | Ozguz et al. |
| 2003/0227798 A1 | 12/2003 | Pax ............... 365/189.12 |
| 2003/0229734 A1 | 12/2003 | Chang et al. |
| 2003/0229762 A1 | 12/2003 | Maiyuran et al. ............... 711/137 |
| 2003/0229770 A1 | 12/2003 | Jeddeloh ............... 711/213 |
| 2003/0233601 A1 | 12/2003 | Vaid et al. |
| 2003/0235072 A1 | 12/2003 | Kim et al. |
| 2003/0235099 A1 | 12/2003 | Mori et al. |
| 2004/0006671 A1 | 1/2004 | Handgen et al. |
| 2004/0008545 A1 | 1/2004 | Korotkov et al. |
| 2004/0015650 A1 | 1/2004 | Zumkehr et al. |
| 2004/0015666 A1 | 1/2004 | Rojas et al. |
| 2004/0019728 A1 | 1/2004 | Sharma |
| 2004/0022094 A1 | 2/2004 | Radhakrishnan et al. .... 365/200 |
| 2004/0024948 A1 | 2/2004 | Winkler et al. ............... 710/311 |
| 2004/0024959 A1 | 2/2004 | Taylor |
| 2004/0024978 A1 | 2/2004 | Jeddeloh |
| 2004/0028412 A1 | 2/2004 | Murphy |
| 2004/0034753 A1 | 2/2004 | Jeddeloh |
| 2004/0034825 A1 | 2/2004 | Jeddeloh |
| 2004/0039886 A1 | 2/2004 | Christofferson et al. |
| 2004/0041606 A1 | 3/2004 | Kirsch |
| 2004/0044833 A1 | 3/2004 | Ryan ............... 711/5 |
| 2004/0044857 A1 | 3/2004 | Jeddeloh et al. |
| 2004/0047169 A1 | 3/2004 | Lee et al. ............... 365/63 |
| 2004/0049649 A1 | 3/2004 | Durrant |
| 2004/0064602 A1 | 4/2004 | George ............... 710/22 |
| 2004/0107306 A1 | 6/2004 | Barth et al. ............... 710/310 |
| 2004/0122911 A1 | 6/2004 | Chong et al. |
| 2004/0122988 A1 | 6/2004 | Han et al. |
| 2004/0123043 A1 | 6/2004 | Rotithor et al. |
| 2004/0123088 A1 | 6/2004 | Poisner et al. |
| 2004/0123180 A1 | 6/2004 | Soejima et al. |
| 2004/0126115 A1 | 7/2004 | Levy et al. ............... 398/116 |
| 2004/0128421 A1 | 7/2004 | Forbes |
| 2004/0128433 A1 | 7/2004 | Bains |
| 2004/0128449 A1 | 7/2004 | Osborne et al. ............... 711/137 |
| 2004/0144994 A1 | 7/2004 | Lee et al. ............... 257/200 |
| 2004/0148482 A1 | 7/2004 | Grundy et al. |
| 2004/0158677 A1 | 8/2004 | Dodd |
| 2004/0160206 A1 | 8/2004 | Komaki et al. ............... 318/569 |
| 2004/0170196 A1 | 9/2004 | Susnow |
| 2004/0193821 A1 | 9/2004 | Ruhovets et al. ............. 711/167 |
| 2004/0199730 A1 | 10/2004 | Eggers et al. |
| 2004/0199843 A1 | 10/2004 | Hansquine et al. |
| 2004/0216018 A1 | 10/2004 | Cheung |
| 2004/0225787 A1 | 11/2004 | Ma et al. |
| 2004/0225847 A1 * | 11/2004 | Wastlick et al. ............... 711/158 |
| 2004/0230718 A1 | 11/2004 | Polzin et al. ............... 710/22 |
| 2004/0236885 A1 | 11/2004 | Fredriksson et al. ......... 710/100 |
| 2004/0237001 A1 | 11/2004 | Schulz et al. |
| 2004/0243769 A1 | 12/2004 | Frame et al. |
| 2004/0251929 A1 | 12/2004 | Pax et al. |
| 2004/0251936 A1 | 12/2004 | Gomm ............... 327/141 |
| 2004/0257890 A1 | 12/2004 | Lee et al. |
| 2004/0260864 A1 | 12/2004 | Lee et al. |
| 2004/0260909 A1 | 12/2004 | Lee et al. |
| 2004/0260957 A1 | 12/2004 | Jeddeloh et al. |
| 2004/0268009 A1 | 12/2004 | Shin et al. |
| 2004/0268061 A1 | 12/2004 | Khare et al. |
| 2005/0015426 A1 | 1/2005 | Woodruff et al. ............. 709/200 |
| 2005/0021884 A1 | 1/2005 | Jeddeloh |
| 2005/0030797 A1 | 2/2005 | Pax et al. |
| 2005/0033874 A1 | 2/2005 | Futral et al. |
| 2005/0044304 A1 | 2/2005 | James |
| 2005/0044327 A1 | 2/2005 | Howard et al. ............... 711/147 |
| 2005/0044457 A1 | 2/2005 | Jeddeloh |
| 2005/0050237 A1 | 3/2005 | Jeddeloh |
| 2005/0050255 A1 | 3/2005 | Jeddeloh |
| 2005/0060533 A1 | 3/2005 | Woo et al. |
| 2005/0060600 A1 | 3/2005 | Jeddeloh |
| 2005/0066113 A1 | 3/2005 | Rajamony et al. |
| 2005/0066137 A1 | 3/2005 | Jeddeloh et al. |
| 2005/0071542 A1 | 3/2005 | Weber et al. ............... 711/105 |
| 2005/0078506 A1 | 4/2005 | Rao et al. |
| 2005/0091464 A1 | 4/2005 | James |
| 2005/0105350 A1 | 5/2005 | Zimmerman ............... 365/201 |
| 2005/0122153 A1 | 6/2005 | Lin ............... 327/291 |
| 2005/0132159 A1 | 6/2005 | Jeddeloh |
| 2005/0144403 A1 | 6/2005 | Jeddeloh |
| 2005/0146943 A1 | 7/2005 | Jeddeloh |
| 2005/0146944 A1 | 7/2005 | Jeddeloh |
| 2005/0146946 A1 | 7/2005 | Taylor |
| 2005/0149603 A1 | 7/2005 | DeSota et al. ............... 709/200 |
| 2005/0149774 A1 | 7/2005 | Jeddeloh et al. |
| 2005/0160201 A1 | 7/2005 | Jeddeloh |
| 2005/0162882 A1 | 7/2005 | Reeves et al. ............... 365/63 |
| 2005/0166006 A1 | 7/2005 | Talbot et al. ............... 711/105 |
| 2005/0169168 A1 | 8/2005 | Aronson et al. ............... 370/222 |
| 2005/0172084 A1 | 8/2005 | Jeddeloh |
| 2005/0177677 A1 | 8/2005 | Jeddeloh |
| 2005/0177690 A1 | 8/2005 | LaBerge |
| 2005/0177695 A1 | 8/2005 | Larson et al. |
| 2005/0177755 A1 | 8/2005 | Fung |
| 2005/0210185 A1 | 9/2005 | Renick |
| 2005/0210216 A1 | 9/2005 | Jobs et al. |
| 2005/0213611 A1 | 9/2005 | James |
| 2005/0216648 A1 | 9/2005 | Jeddeloh |
| 2005/0216677 A1 | 9/2005 | Jeddeloh et al. |
| 2005/0216678 A1 | 9/2005 | Jeddeloh |
| 2005/0223161 A1 | 10/2005 | Jeddeloh |
| 2005/0228939 A1 | 10/2005 | Janzen |
| 2005/0243829 A1 | 11/2005 | Spencer |
| 2005/0246558 A1 | 11/2005 | Ku |
| 2005/0257021 A1 | 11/2005 | James |
| 2005/0268060 A1 | 12/2005 | Cronin et al. |
| 2005/0283681 A1 | 12/2005 | Jeddeloh |

(56) References Cited

U.S. PATENT DOCUMENTS

| | | |
|---|---|---|
| 2005/0286506 A1 | 12/2005 | LaBerge |
| 2006/0022724 A1 | 2/2006 | Zerbe et al. ............ 327/141 |
| 2006/0023528 A1 | 2/2006 | Pax et al. |
| 2006/0047891 A1 | 3/2006 | James et al. |
| 2006/0066375 A1 | 3/2006 | LaBerge |
| 2006/0075282 A1 | 4/2006 | Borkenhagen et al. |
| 2006/0085616 A1 | 4/2006 | Zeighami et al. |
| 2006/0136683 A1 | 6/2006 | Meyer et al. |
| 2006/0168407 A1 | 7/2006 | Stern |
| 2006/0174070 A1 | 8/2006 | Jeddeloh |
| 2006/0179203 A1 | 8/2006 | Jeddeloh |
| 2006/0179208 A1 | 8/2006 | Jeddeloh |
| 2006/0195647 A1 | 8/2006 | Jeddeloh |
| 2006/0200598 A1 | 9/2006 | Janzen |
| 2006/0200602 A1 | 9/2006 | James |
| 2006/0200642 A1 | 9/2006 | LaBerge |
| 2006/0204247 A1 | 9/2006 | Murphy |
| 2006/0206667 A1 | 9/2006 | Ryan |
| 2006/0206679 A1 | 9/2006 | Jeddeloh et al. |
| 2006/0206742 A1 | 9/2006 | James |
| 2006/0206761 A1 | 9/2006 | Jeddeloh |
| 2006/0206766 A1 | 9/2006 | Jeddeloh |
| 2006/0212655 A1 | 9/2006 | Jeddeloh et al. |
| 2006/0212666 A1 | 9/2006 | Jeddeloh |
| 2006/0218318 A1 | 9/2006 | James |
| 2006/0218331 A1 | 9/2006 | James |
| 2006/0271720 A1 | 11/2006 | James et al. |
| 2006/0271746 A1 | 11/2006 | Meyer et al. |
| 2006/0288172 A1 | 12/2006 | Lee et al. |
| 2007/0011392 A1 | 1/2007 | Lee et al. |
| 2007/0025133 A1 | 2/2007 | Taylor |
| 2007/0033353 A1 | 2/2007 | Jeddeloh |
| 2007/0035980 A1 | 2/2007 | Taylor |
| 2007/0055817 A1 | 3/2007 | Jeddeloh |
| 2007/0088915 A1 | 4/2007 | Archambault et al. |
| 2007/0113027 A1 | 5/2007 | Jeddeloh |
| 2007/0143553 A1 | 6/2007 | LaBerge |
| 2007/0168595 A1 | 7/2007 | Jeddeloh |
| 2007/0271435 A1 | 11/2007 | Jeddeloh et al. |
| 2008/0036492 A1 | 2/2008 | Pax et al. |
| 2008/0162861 A1 | 7/2008 | Jobs et al. |
| 2009/0013211 A1 | 1/2009 | Vogt et al. ............ 714/5 |
| 2009/0125688 A1 | 5/2009 | Jeddeloh |
| 2010/0153794 A1 | 6/2010 | Jeddeloh |

FOREIGN PATENT DOCUMENTS

| | | |
|---|---|---|
| EP | 0843261 A2 | 5/1998 |
| EP | 0849685 A2 | 6/1998 |
| EP | 1199637 A2 | 4/2002 |
| GB | 2244157 A | 11/1991 |
| GB | 2288066 A | 10/1995 |
| JP | 60059814 A | 4/1985 |
| JP | 01161912 A | 6/1989 |
| JP | 06004401 A | 1/1994 |
| JP | 06028180 A | 2/1994 |
| JP | 06-104707 | 4/1994 |
| JP | 08023267 A | 1/1996 |
| JP | 08185383 A | 7/1996 |
| JP | 10214223 A | 8/1998 |
| JP | 10228413 A | 8/1998 |
| JP | 2001265539 A | 9/2001 |
| JP | 2002-342161 | 11/2002 |
| JP | 2005-342084 | 12/2005 |
| KR | 2000-0067533 A | 11/2000 |
| KR | 2006021440 A | 3/2006 |
| TW | 491970 B | 6/2002 |
| TW | 498215 | 8/2002 |
| WO | 9318459 A1 | 9/1993 |
| WO | WO 93/19422 | 9/1993 |
| WO | 9704401 A2 | 2/1997 |
| WO | WO 98/57489 | 12/1998 |
| WO | 99/26139 A1 | 5/1999 |
| WO | 9923570 A1 | 5/1999 |
| WO | 9934294 A1 | 7/1999 |
| WO | 0026798 A1 | 5/2000 |
| WO | 0043902 A1 | 7/2000 |
| WO | WO 02/23353 A2 | 3/2002 |

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

HyperTransport I/O Link Specification; HyperTransport Technology Consortium, 2001, pp. 46-49.

"Design-for-Test Analysis of a Buffer SDRAM DIMM" by Jandhyala et al. This paper appears in: Records of the 1996 IEEE Memory Technology, International Workshop on Design and Testing, Publication Date: 1996 on pp. 110-116 ISSN: 1087-4852 ISBN: 0-8186-7466-0.

"Processor Synchronization Circuitry for Computer Systems". IBM Technical Disclosure Bulletin. International Business Machines Corp. (Thornwood). US. vol. 36. No. 8. Aug. 1, 1993 pp. 385-387. XP000390266.

Clugston, Mike, "Definition of cache", 2004, www.xreferplus.com.

Depari, A. et al, "USB Sensor Network for Industrial Applications", Instrumentation and Measurement Technology Conference, 2004, IMTC 04, Proceedings of the 21.sup.st IEEE, vol. 2, May 2004, Abstract only. One page.

Gillett, R. et al., "Using the Memory Channel Network", Micro IEEE, vol. 17, Issue 1, Jan.-Feb. 1997, Abstract Only, Two pages.

Gillingham, Peter, "SLDRAM Architectural and Functional Overview", 1997 SLDRAM Consortium, Aug. 29, 1997, pp. 1-14.

Gommans et al., "Applications Drive Secure Lightpath Creation Across Heterogeneous Domains", Communications Magazine, IEEE, vol. 44, Issue 3, Mar. 2006 (Abstract Only).

Hellwagner, Hermann et al., "Enabling a PC Cluster for High-Performance Computing", The Speedup Journal, vol. 11, No. 1, Jun. 1997, pp. 1-9.

Hsieh, M. et al., "On the Design of A Local Switch for Heterogenous Multi-Subsystem Interconnect", TENCON '93, Proceedings, Computer, Communications, Control and Power Engineering, 1993, IEEE Region 10 Conference, vol. 3, Oct. 1993. Abstract Only.One page.

Jones, R. "Throughput Expansion with FET Based Crossbar Switching", Pericom, Application Note 45, Nov. 12, 2001, pp. 1-5.

Omkar et al., "Neural Network Controller for Minimizing Hub Shear Forces in Helicopter", IEEE Xplore, Sep. 1998 (Abstract Only).

Parrella, E.L.; "Testability features in a high-density memory module," ASIC Seminar and Exhibit, 1990. Proceedings, Third Annual IEEE, vol., No. pp. P3/1.1-P3/1.3, Sep. 17-21, 1990 doi: 10.1109/ASIC.1990.186104.

Rambus, Inc., "Direct Rambus.TM. Technology Disclosure", Oct. 1997. pp. 1-16.

Scott, Noel D. et al., "An Overview of the Visualize FX Graphics Accelerator Hardware," The Hewlett-Packard Journal, Article 4, May 1998, pp. 28-34.

Supplementary European Search Report, EP 05726001, dated Dec. 27, 2010.

Webopedia Computer Dictionary, HUB Nov. 20, 2006, Webopedia, p. 1.

* cited by examiner

FIG.4

ARBITRATION SYSTEM AND METHOD FOR MEMORY RESPONSES IN A HUB-BASED MEMORY SYSTEM

This application is a divisional of U.S. patent application Ser. No. 10/690,810 filed Oct. 20, 2003 and issued as U.S. Pat. No. 7,120,743 on Oct. 10, 2006.

TECHNICAL FIELD

This invention relates to computer systems, and, more particularly, to a computer system including a system memory having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a memory hub controller is coupled over a high speed data link to several memory modules. Typically, the memory modules are coupled in a point-to-point or daisy chain architecture such that the memory modules are connected one to another in series. Thus, the memory hub controller is coupled to a first memory module over a first high speed data link, with the first memory module connected to a second memory module through a second high speed data link, and the second memory module coupled to a third memory module through a third high speed data link, and so on in a daisy chain fashion.

Each memory module includes a memory hub that is coupled to the corresponding high speed data links and a number of memory devices on the module, with the memory hubs efficiently routing memory requests and memory responses between the controller and the memory devices over the high speed data links. Each memory requests typically includes a memory command specifying the type of memory access (e.g., a read or a write) called for by the request, a memory address specifying a memory location that is to be accessed, and, in the case of a write memory request, write data. The memory request also normally includes information identifying the memory module that is being accessed, but this can be accomplished by mapping different addresses to different memory modules. A memory response is typically provided only for a read memory request, and typically includes read data as well as an identifying header that allows the memory hub controller to identify the memory request corresponding to the memory response. However, it should be understood that memory requests and memory responses having other characteristics may be used. In any case, in the following description, memory requests issued by the memory hub controller propagate downstream from one memory hub to another, while memory responses propagate upstream from one memory hub to another until reaching the memory hub controller. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi drop bus architectures.

Although computer systems using memory hubs may provide superior performance, they nevertheless may often fail to operate at optimum speeds for a variety of reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

Another factor that can reduce the speed of memory transfers in a memory hub system is the transferring of read data upstream (i.e., back to the memory hub controller) over the high-speed links from one hub to another. Each hub must determine whether to send local responses first or to forward responses from downstream memory hubs first, and the way in which this is done affects the actual latency of a specific response, and more so, the overall latency of the system memory. This determination may be referred to as arbitration, with each hub arbitrating between local requests and upstream data transfers.

There is a need for a system and method for arbitrating data transfers in a system memory having a memory hub architecture to lower the latency of the system memory.

SUMMARY OF THE INVENTION

According to one aspect of the present invention, a memory hub includes a local queue that receives and stores local memory responses. A bypass path receives downstream memory responses and passes the downstream memory responses while a buffered queue is coupled to the bypass path and stores downstream memory responses. A multiplexer is coupled to the local queue, the bypass path, and the buffered queue, and outputs one of the responses responsive to a control signal. Arbitration control logic is coupled to the multiplexer and develops the control signal to control the source of the responses output by the multiplexer.

DETAILED DESCRIPTION OF THE INVENTION

Figure 1:
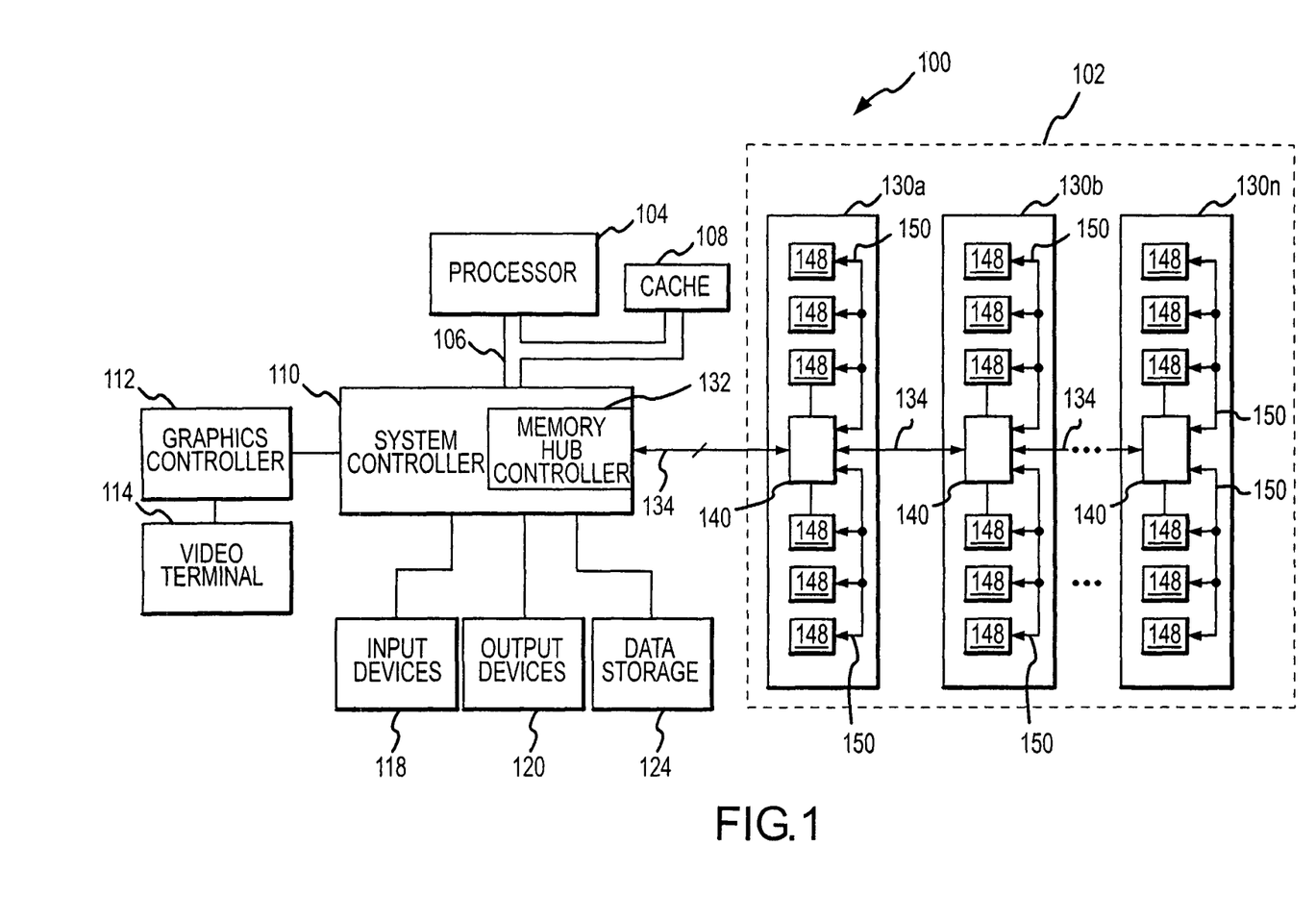
FIG. 1 is a block diagram of a computer system including a system memory having a high bandwidth memory hub architecture according to one example of the present invention.

A computer system 100 according to one example of the present invention is shown in FIG. 1. The computer system 100 includes a system memory 102 having a memory hub architecture including a plurality of memory modules 130, each memory module including a corresponding memory hub 140. Each of the memory hubs 140 arbitrates between memory responses from the memory module 130 on which the hub is contained and memory responses from downstream memory modules, and in this way the memory hubs effectively control the latency of respective memory modules in the system memory by controlling how quickly responses are returned to a system controller 110, as will be described in more detail below. In the following description, certain details are set forth to provide a sufficient understanding of the present invention. One skilled in the art will understand, however, that the invention may be practiced without these particular details. In other instances, well-known circuits, control signals, timing protocols, and/or software operations have not been shown in detail or omitted entirely in order to avoid unnecessarily obscuring the present invention.

The computer system 100 includes a processor 104 for performing various computing functions, such as executing specific software to perform specific calculations or tasks. The processor 104 is typically a central processing unit ("CPU") having a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to the system controller 110, which is also sometimes referred to as a "North Bridge" or "memory controller."

The system controller 110 serves as a communications path to the processor 104 for the memory modules 130 and for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 also includes a memory hub controller ("MHC") 132 that is coupled to the system memory 102 including the memory modules 130a,b...n, and operates to apply commands to control and access data in the memory modules. The memory modules 130 are coupled in a point-to-point or daisy chain architecture through respective high speed links 134 coupled between the modules and the memory hub controller 132. The high-speed links 134 may be optical, RF, or electrical communications paths, or may be some other suitable type of communications paths, as will be appreciated by those skilled in the art. In the event the high-speed links 134 are implemented as optical communications paths, each optical communication path may be in the form of one or more optical fibers, for example. In such a system, the memory hub controller 132 and the memory modules 130 will each include an optical input/output port or separate input and output ports coupled to the corresponding optical communications paths. Although the memory modules 130 are shown coupled to the memory hub controller 132 in a daisy architecture, other topologies that may be used, such as a ring topology, will be apparent to those skilled in the art.

Each of the memory modules 130 includes the memory hub 140 for communicating over the corresponding high-speed links 134 and for controlling access to six memory devices 148, which are synchronous dynamic random access memory ("SDRAM") devices in the example of FIG. 1. The memory hubs 140 each include input and output ports that are coupled to the corresponding high-speed links 134, with the nature and number of ports depending on the characteristics of the high-speed links. A fewer or greater number of memory devices 148 may be used, and memory devices other than SDRAM devices may also be used. The memory hub 140 is coupled to each of the system memory devices 148 through a bus system 150, which normally includes a control bus, an address bus, and a data bus.

As previously mentioned, each of the memory hubs 140 executes an arbitration process that controls the way in which memory responses associated with the memory module 130 containing that hub and memory responses from downstream memory modules are returned to the memory hub controller 132. In the following description, upstream memory responses associated with the particular memory hub 140 and the corresponding memory module 130 will be referred to as "local" upstream memory responses or simply "local responses," while upstream memory responses from downstream memory modules will be referred to as downstream memory responses or simply "downstream responses." In operation, each memory hub 140 executes a desired arbitration process to control the way in which local and downstream responses are returned to the memory hub controller 132. For example, each hub 140 may give priority to downstream responses and thereby forward such downstream responses upstream prior to local responses that need to be sent upstream. Conversely, each memory hub 140 may give priority to local responses and thereby forward such local responses upstream prior to downstream responses that need to be sent upstream. Examples of arbitration processes that may be executed by the memory hubs 140 will be described in more detail below.

Each memory hub 140 may execute a different arbitration process or all the hubs may execute the same process, with this determination depending on the desired characteristics of the system memory 102. It should be noted that the arbitration process executed by each memory hub 140 is only applied when a conflict exists between local and downstream memory responses. Thus, each memory hub 140 need only execute the corresponding arbitration process when both local and downstream memory responses need to be returned upstream.

Figure 2:
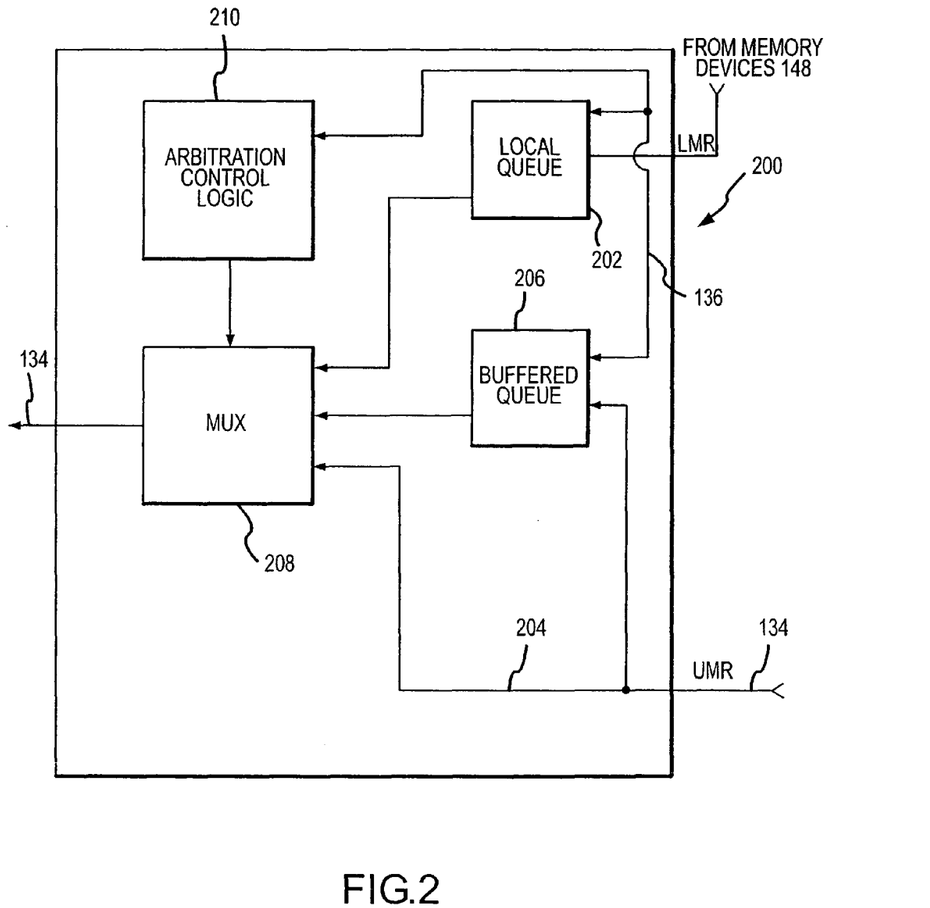
FIG. 2 is a functional block diagram illustrating an arbitration control component contained in each of the memory hubs of FIG. 1 according to one example of the present invention.

FIG. 2 is a functional block diagram illustrating an arbitration control component 200 contained in the memory hubs 140 of FIG. 1 according to one embodiment of the present invention. The arbitration control component 200 includes two queues for storing associated memory responses. A local queue 202 receives and stores local memory responses LMR from the memory devices 140 on the associated memory module 130. A buffered queue 206 receives and stores downstream memory responses which cannot be immediately forwarded upstream through a bypass path 204. A multiplexer 208 selects responses from one of the queues 202, 206 or the bypass path 204 under control of arbitration control logic 210 and supplies the memory responses in the selected queue upstream over the corresponding high-speed link 134. The arbitration control logic 210 is coupled to the queues 202, 206 through a control/status bus 136, which allows the logic 210 to monitor the contents of each of the queues 202, 206, and utilizes this information in controlling the multiplexer 208 to thereby control the overall arbitration process executed by the memory hub 140. The control/status bus 136 also allows "handshaking" signals to be coupled from the queues 202, 206 to the arbitration logic 210 to coordinate the transfer of control signals from the arbitration logic 210 to the queues 202, 206.

Figure 3:
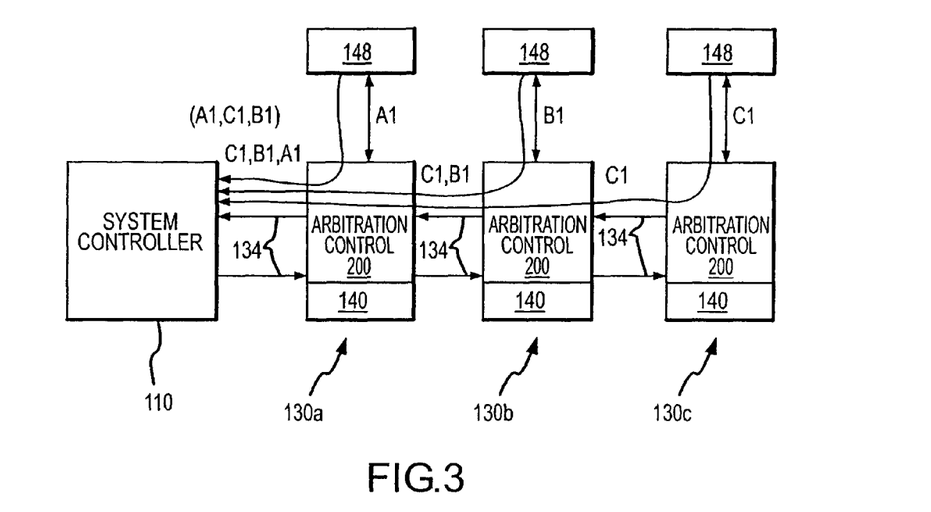
FIG. 3 is a functional flow diagram illustrating the flow of upstream memory responses in a process executed by the arbitration control component of FIG. 2 where downstream responses are give priority over local responses according to one embodiment of the present invention.

The specific operation of the arbitration control logic 210 in controlling the multiplexer 208 to provide responses from one of the queues 202, 206 or the bypass path 204 depends on the particular arbitration process being executed by the control logic. Several example arbitration processes that may be executed by the control logic 210 will now be described in more detail with reference to FIGS. 3 and 4. FIG. 3 is a functional flow diagram illustrating the flow of upstream memory responses in a process executed by the arbitration control component 200 of FIG. 2 where downstream responses are given priority over local responses according to one embodiment of the present invention. In the example of FIG. 3, the memory hub controller 132 applies a memory request to each of the memory modules 130a, 130b, and 130c. Each of the memory modules 130a-c provides a corresponding upstream response in response to the applied request, with the responses for the modules 130a, 130b, and 130c being designated A1, B1, and C1, respectively. The responses B1 and C1 are assumed to arrive at the local queue 202 and bypass path 204 in the hub 140 of the module 130b at approximately the same time. In this embodiment, the arbitration control logic 210 gives priority to downstream responses, and as a result the hub 140 in module 130b forwards upstream the downstream responses C1 first and thereafter forwards upstream the local response B1 as shown in FIG. 3.

If the response C1 arrives in the bypass path 204 in the hub 140 of the module 130a at approximately the same time as the local response A1 arrives in the local queue 202, the arbitration control logic 210 forwards upstream the downstream response C1 prior to the local response A1. Moreover, if the response B1 arrives in the bypass path 204 in the hub 140 of module 130a at approximately the same time as the downstream response C1, then arbitration control logic 210 forwards upstream the downstream response C1 followed by response B1 followed by local response A1, as shown in FIG. 3. The system controller 110 thus receives the responses C1, B1, and A1 in that order.

Because the arbitration control logic 210 in each memory hub 140 may execute an independent arbitration process, the arbitration control logic in the memory hub of the module 130a could give priority to local responses over downstream responses. In this situation, if the responses C1 and B1 arrive at the bypass path 204 in the hub 140 of the module 130a at approximately the same time as the local response A1 arrives in the local queue 202, the arbitration control logic 210 forwards upstream the local response A1 prior to the downstream responses C1 and B1. The memory hub controller 132 thus receives the responses A1, C1 and B1 in that order, as shown in parentheses in FIG. 3. Thus, by assigning different arbitration processes to different memory hubs 140 the latency of the corresponding memory modules 130 may be controlled. For example, in the first example of FIG. 3 where priority is given to downstream responses, the latency of the module 130a is higher than in the second example where in module 130a priority is given to local responses. In the second example, the memory hub controller 132 could utilize the module 130a to store frequently accessed data so that the system controller can more quickly access this data. Note that in the second example the responses C1, B1 would first be transferred to the buffered queue 206 since they could not be forwarded upstream immediately, and after response A1 is forwarded the responses C1, B1 would be forwarded from the buffered queue.

Figure 4:
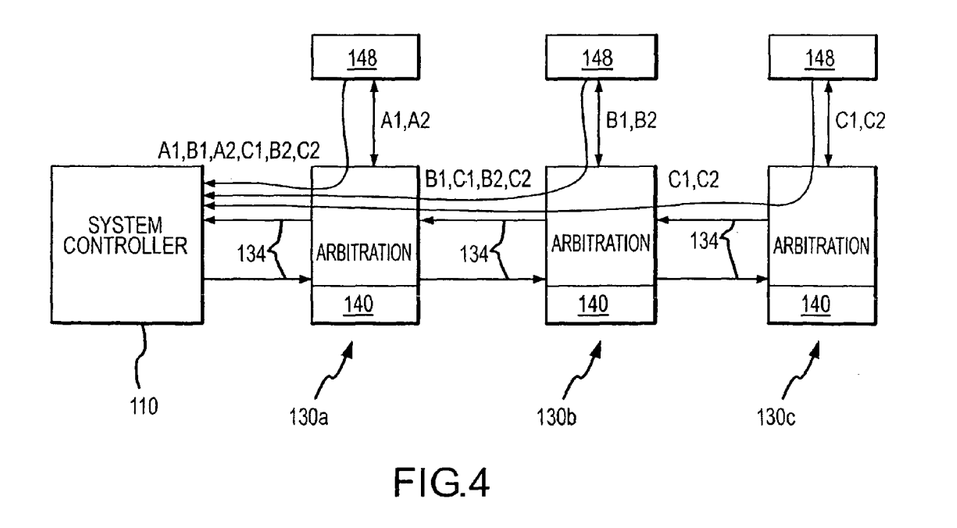
FIG. 4 is a functional flow diagram illustrating the flow of upstream memory responses in a process executed by the arbitration control component of FIG. 2 to provide equal bandwidth for local and downstream memory responses.

FIG. 4 is a functional flow diagram illustrating the flow of upstream memory responses in a process executed by the arbitration control component 200 of FIG. 2 to alternate between a predetermined number of responses from local and downstream memory. In the example of FIG. 4, the memory hub controller 132 applies two memory requests to each of the memory modules 130a, 130b, and 130c, with the requests applied to module 130a being designated A1, A2, requests applied to module 130b being designated B1, B2, and requests to module 130c being designated C1, C2. The responses C1 and C2 are assumed to arrive at the bypass path 204 in the hub 140 of the module 130b at approximately the same time as the local responses B1, B2 arrive at the local queue 202. The responses C1, C2 are transferred to the buffered queue 206 since they cannot be forwarded upstream immediately. The arbitration control logic 210 thereafter alternately forwards responses from the local queue 202 and the buffered queue 206. In the example of FIG. 4, the local response B1 from the local queue 202 is forwarded first, followed by the downstream response C1 from the buffered queue 206, then the local response B2 and finally the downstream response C2.

Now in the module 130a, the responses B1, C1, B2, C2 are assumed to arrive at the bypass path 204 in the hub 140 at approximately the same time as the local responses A1, A2 arrive at the local queue 202. The responses B1, C1, B2, C2 are transferred to the buffered queue 206 since they cannot be forwarded upstream immediately. The arbitration control logic 210 thereafter operates in the same way to alternately forward responses from the local queue 202 and the buffered queue 206. The local response A1 from the local queue 202 is forwarded first, followed by the downstream response B1 from the buffered queue 206, then the local response A2 followed by downstream response C1. At this point, the local queue 202 is empty while the buffered queue 206 still contains the responses B2, C2. No conflict between local and downstream responses exists, and the arbitration control logic 200 accordingly forwards upstream the remaining responses B2, C2 to empty the buffered queue 206.

In the arbitration process illustrated by FIG. 4, the arbitration control logic 210 forwarded a predetermined number of either local or downstream responses prior to forwarding the other type of response. For example, in the process just described the arbitration control logic 210 forwards one local response and then one downstream response. Alternatively, the arbitration control logic 210 could forward two local responses followed by two downstream responses, or three local responses followed by three downstream responses, and so on. Furthermore, the arbitration control logic 210 could forward N local responses followed by M downstream responses, where N and M may be selected to give either local or downstream responses priority.

In another embodiment, the arbitration control logic 210 of FIG. 2 executes an oldest first algorithm in arbitrating between local and downstream memory responses. In this embodiment, each memory response includes a response identifier portion and a data payload portion. The response identifier portion identifies a particular memory response and enables the arbitration control logic 210 to determine the age of a particular memory response. The data payload portion includes data being forwarded upstream to the memory hub controller 132, such as read data. In operation, the arbitration control logic 210 monitors the response identifier portions of the memory responses stored in the local queue 202 and the buffered queue 206 and selects the oldest response contained in either of these queues as the next response to be forwarded upstream. Thus, independent of queue 202, 206 in which a memory response is stored, the arbitration control logic 210 forwards the oldest responses first.

In determining the oldest response, the arbitration control logic 210 utilizes the response identifier portion of the memory response and a time stamp assigned to the memory request corresponding to the response. More specifically, the memory hub controller 132 generates a memory request identifier for each memory request. As the memory request passes through each memory hub 140, the arbitration control logic 210 of each hub assigns a time stamp to each request, with the time stamp indicating when the request passed through the memory hub 140. Thus, each hub 140 essentially creates a table of request identifiers and associated time stamps. Thus, the control logic 210 in each hub 140 stores a table of a unique memory request identifier and a corresponding time stamp for each memory request passing through the hub.

In each memory response, the response identifier portion corresponds to the memory request identifier, and thus the response for a given a request is identified by the same identifier. The arbitration control logic 210 thus identifies each memory response stored in the local queue 202 and buffered queue 206 by the corresponding response identifier portion. The control logic 210 then compares the response identifier portion of each response in the queues 202, 206 to the table of request identifiers, and identifies the time stamp of the response identifier as the time stamp associated with the corresponding request identifier in the table. The control logic 210 does this for each response, and then forwards upstream the oldest response as indicated by the corresponding time stamp. The arbitration control logic 210 repeats this process to determine the next oldest response and then forwards that response upstream, and so on.

In the preceding description, certain details were set forth to provide a sufficient understanding of the present invention. One skilled in the art will appreciate, however, that the invention may be practiced without these particular details. Furthermore, one skilled in the art will appreciate that the example embodiments described above do not limit the scope of the present invention, and will also understand that various equivalent embodiments or combinations of the disclosed example embodiments are within the scope of the present invention. Illustrative examples set forth above are intended only to further illustrate certain details of the various embodiments, and should not be interpreted as limiting the scope of the present invention. Also, in the description above the operation of well known components has not been shown or described in detail to avoid unnecessarily obscuring the present invention. Finally, the invention is to be limited only by the appended claims, and is not limited to the described examples or embodiments of the invention.

The invention claimed is:

1. A method of processing and forwarding memory responses in a memory system including a plurality of memory modules, each memory module including a memory hub coupled to memory devices, and the method comprising:
   storing local memory responses having data retrieved from the memory devices, the local memory responses made in response to associated memory requests requesting the retrieved data from the memory devices;
   storing downstream memory responses having data retrieved from downstream memory modules, the downstream memory responses made in response to associated memory requests requesting data from the downstream memory modules;
   applying in each hub an independent arbitration algorithm to determine an order in which the stored local and downstream memory responses are forwarded to an upstream memory module; and
   forwarding the local and downstream memory responses upstream according to the determined order.

2. The method of claim 1 wherein stored local memory responses are forwarded upstream prior to forwarding downstream memory responses upstream.

3. The method of claim 1 wherein stored downstream memory responses are forwarded upstream prior to forwarding local memory responses upstream.

4. The method of claim 1 wherein stored local and downstream memory responses are alternately forwarded upstream.

5. The method of claim 4 wherein a first number of local memory responses are forwarded upstream and a second number of downstream memory responses are forwarded upstream.

6. The method of claim 5 wherein the first and second numbers are equal.

7. The method of claim 1 wherein the stored local and downstream memory responses are forwarded upstream as a function of an age of a memory request associated with each memory response.

8. The method of claim 7 wherein a time stamp is assigned to each memory request when the request is received by each hub, and wherein the age of each memory request corresponds to the assigned time stamp.

9. The method of claim 1 wherein each of the local and downstream memory responses comprise data and a header identifying a memory request corresponding to the memory response.

10. A method of data forwarding by a plurality of memory modules each of which coupled to at least one other memory module, comprising:
- receiving local data, the local data provided in response to an associated memory request requesting the local data;
- receiving downstream data from at least one other memory module waiting to be forwarded, the downstream data provided in response to an associated memory request requesting the downstream data from the at least one other memory module;
- in response to receiving local and downstream data waiting to be forwarded in one of the memory modules, applying an independent algorithm to determine an order in which the local and downstream data are to be forwarded; and
- forwarding the local and downstream data in the determined order.

11. The method of claim 10 wherein the respective memory module applies an age-based algorithm that determines the order based on an age of a respective memory request associated with each of the local and downstream data, wherein the age is determined by a respective time stamp assigned to each memory request.

12. The method of claim 10 wherein the respective memory module applies an algorithm that alternatively forwards a first number of local data and a second number of downstream data.

13. The method of claim 10 wherein the respective memory module applying an independent algorithm to determine an order in which the local and downstream data are to be forwarded comprises a first memory module applying a first algorithm to determine a first order in which local and downstream data are forwarded from the first memory module, and a second memory module applying a second algorithm different from the first algorithm to determine a second order in which local and downstream data are forwarded from the second memory module.

14. A memory hub, comprising:
- a local queue configured to receive and store local memory responses including local data, the local memory responses made in response to associated memory requests requesting the local data;
- a buffered queue configured to receive and store downstream memory responses including downstream data, the downstream memory responses made in response to associated memory requests requesting the downstream data; and
- control logic coupled to the local and buffered queues, the control logic operable to set a priority to forward the stored local and downstream memory responses using one of a plurality of arbitration algorithms, the control logic further operable to forward the stored local and downstream memory responses in accordance with the priority.

15. The memory hub of claim 14 wherein the control logic sets the priority according to an age-based algorithm that determines the priority based on an age of a respective memory request associated with each of the local and downstream memory responses, wherein the age is determined by a respective time stamp assigned to each memory request.

16. The memory hub of claim 14 wherein the control logic sets the priority according to an algorithm that alternatively forwards a first number of local memory responses and a second number of downstream memory responses.

17. The memory hub of claim 14 wherein the control logic is operable to forward local memory responses before downstream memory responses in a first mode and is further operable to forward downstream memory responses before local memory responses in a second mode.

18. A memory module, comprising:
- at least one memory device; and
- a memory hub coupled to the at least one memory device, the memory hub including:
  - a local queue configured to receive and store local memory responses having data, the local memory responses made in response to associated memory requests requesting the data;
  - a buffered queue configured to receive and store downstream memory responses having data, the downstream memory responses made in response to associated memory requests requesting the data;
  - a selection circuit coupled to the local and buffered queues, the selection circuit operable to forward the local and downstream memory responses from one of the queues in response to a control signal; and
  - arbitration logic coupled to the selection circuit, the arbitration logic operable to determine an order in which the local and downstream memory responses stored in the queues are forwarded using one of a plurality of arbitration algorithms, the arbitration logic further operable to generate the control signal based on the determined order.

19. The memory module of claim 18 wherein the arbitration logic employs a time-based algorithm that sets the order based on an age of a respective memory request associated with each of the local and downstream memory responses, wherein the age is determined by a respective time stamp assigned to each memory request.

20. The memory module of claim 18 wherein the arbitration logic determines the order using an arbitration algorithm that alternatively forwards a first number of local memory responses and a second number of downstream memory responses.

21. The memory module of claim 18 wherein the arbitration logic forwards local memory responses before downstream memory responses in a first mode, and forwards downstream memory responses before local memory responses in a second mode.

22. A computer system, comprising:
- an input device;
- an output device;
- a processor coupled to the input and output devices; and
- a plurality of memory modules, at least one of the memory modules coupled to the processor and each memory module coupled to at least one other memory module, each memory module comprising:
  - at least one memory device; and
  - a memory hub coupled to the at least one memory device, the memory hub operable to receive and store local memory responses having data retrieved from the at least one memory device and to receive and store memory responses having data retrieved from at least one other memory module, the local memory responses and the memory responses having data retrieved from the other memory module made in response to associated memory requests requesting the respective data, the memory hub further operable to transmit the local and forwarded memory responses in an order determined by one of a plurality of arbitration algorithms if the memory hub has both local and forwarded memory responses stored therein.

23. The computer system of claim 22 wherein the memory hub is operable to transmit local and forwarded memory responses using a time-based algorithm, and wherein the time-based algorithm determines the order based on an age of a respective memory request associated with each of the local and forwarded memory responses using a respective time stamp assigned to each memory request.

24. The computer system of claim 22 wherein the memory hub is operable to transmit local and forwarded memory responses using an arbitration algorithm that alternatively transmits a first number of local memory responses and a second number of forwarded memory responses.

25. The computer system of claim 22 wherein the memory hub of a first memory module applies a first arbitration algorithm to determine a first order in which local and forwarded memory responses are transmitted by the first memory hub, and wherein the memory hub of a second memory module applies a second arbitration algorithm different from the first arbitration algorithm to determine a second order in which local and forwarded memory responses are transmitted by the second memory hub.

* * * * *